（12）United States Patent
Zheng et al.

(10) Patent No.: US 8,051,072 B2
(45) Date of Patent: Nov. 1, 2011

(54) LEARNING RANKING FUNCTIONS INCORPORATING BOOSTED RANKING IN A REGRESSION FRAMEWORK FOR INFORMATION RETRIEVAL AND RANKING

(75) Inventors: Zhaohui Zheng, Sunnyvale, CA (US); Hongyuan Zha, Norcross, GA (US); Gordon Sun, Redwood Shores, CA (US)

(73) Assignee: Yahoo! Inc., Sunnyvale, CA (US)

( * ) Notice: Subject to any disclaimer, the term of this patent is extended or adjusted under 35 U.S.C. 154(b) by 531 days.

(21) Appl. No.: 12/060,179

(22) Filed: Mar. 31, 2008

(65) Prior Publication Data

US 2009/0248667 A1    Oct. 1, 2009

(51) Int. Cl.
*G06F 17/30* (2006.01)
(52) U.S. Cl. ........................................ 707/722; 707/723
(58) Field of Classification Search .................. 707/722, 707/723
See application file for complete search history.

(56) References Cited

U.S. PATENT DOCUMENTS

| 7,593,934 B2 * | 9/2009 | Li et al. ................................. 1/1 |
| 2009/0006360 A1 * | 1/2009 | Liao et al. ......................... 707/5 |
| 2009/0106221 A1 * | 4/2009 | Meyerzon et al. ................. 707/5 |
| 2009/0132515 A1 * | 5/2009 | Lu et al. .............................. 707/5 |
| 2009/0222437 A1 * | 9/2009 | Niu et al. ........................... 707/5 |

OTHER PUBLICATIONS

Zha et al., "Incorporating Query Difference for Learning Retrieval Functions in World Wide Web Search", Nov. 5, 2006, ACM, pp. 307-316.*
Zheng et al., "A Regression Framework for Learning Ranking Functions Using Relative Relevance Judgments", Jul. 23, 2007, ACM, pp. 287-294.*
Zha, et al., "A General Boosting Method and Its Application to Learning Ranking Functions for Web Search", 2007, NIPS, pp. 1-8.

\* cited by examiner

*Primary Examiner* — Hung Q Pham
(74) *Attorney, Agent, or Firm* — Seth H. Ostrow; Ostrow Kaufman LLP

(57) ABSTRACT

Embodiments of the present invention provide for methods, systems and computer program products for learning ranking functions to determine the ranking of one or more content items that are responsive to a query. The present invention includes generating one or more training sets comprising one or more content item-query pairs, determining preference data for the one or more query-content item pairs of the one or more training sets and determining labeled data for the one or more query-content item pairs of the one or more training sets. A ranking function is determined based upon the preference data and the labeled data for the one or more content-item query pairs of the one or more training sets. The ranking function is then stored for application to query-content item pairs not contained in the one or more training sets.

27 Claims, 3 Drawing Sheets

LEARNING RANKING FUNCTIONS INCORPORATING BOOSTED RANKING IN A REGRESSION FRAMEWORK FOR INFORMATION RETRIEVAL AND RANKING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to information retrieval and ranking. More specifically, the present invention relates to systems, methods and computer program products for the determination of learning ranking functions that incorporate boosted ranking to determine the ranking of one or more content items that are responsive to a query.

BACKGROUND OF THE INVENTION

The World Wide Web provides access to an extraordinary large collection of information sources (in various formats including text, images, videos and other media content) relating to virtually every subject imaginable. As the World Wide Web has grown, the ability of users to search this collection of information and identify content relevant to a particular subject has become increasingly important.

A user of a search engine, for example, typically supplies a query to the search engine that contains only a few terms and expects the search engine to return a result set comprising relevant content items. Although a search engine may return a result set comprising hundreds of relevant content items, most users are likely to only view the top several content items in a result set. Thus, to be useful to a user, a search engine should determine those content items in a given result set that are most relevant to the user, or that the user would be most interested in, on the basis of the query that the user submits and rank such content items accordingly.

A user's view as to which content items are relevant to the query is influenced by a number of factors, many of which are highly subjective. Due to the highly subjective nature of such factors, it is generally difficult to capture in an algorithmic set of rules those factors that define a function for ranking content items. Furthermore, these subjective factors may change over time, as for example when current events are associated with a particular query term. Thus, users who receive search result sets that contain results not perceived to be highly relevant quickly become frustrated and may potentially abandon the use of a particular search engine. Therefore, designing an effective and efficient function that is operative to retrieve and efficiently rank content items is of the upmost importance to information retrieval.

SUMMARY OF THE INVENTION

Embodiments of the present invention provide for methods, systems and computer program products for learning ranking functions to determine the ranking of one or more content items that are responsive to a query. The present invention includes generating one or more training sets comprising one or more content item-query pairs, determining preference data for the one or more query-content item pairs of the one or more training sets and determining labeled data for the one or more query-content item pairs of the one or more training sets. A ranking function is determined based upon the preference data and the labeled data for the one or more content-item query pairs of the one or more training sets. The ranking function is then stored for application to query-content item pairs not contained in the one or more training sets.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Figure 1:
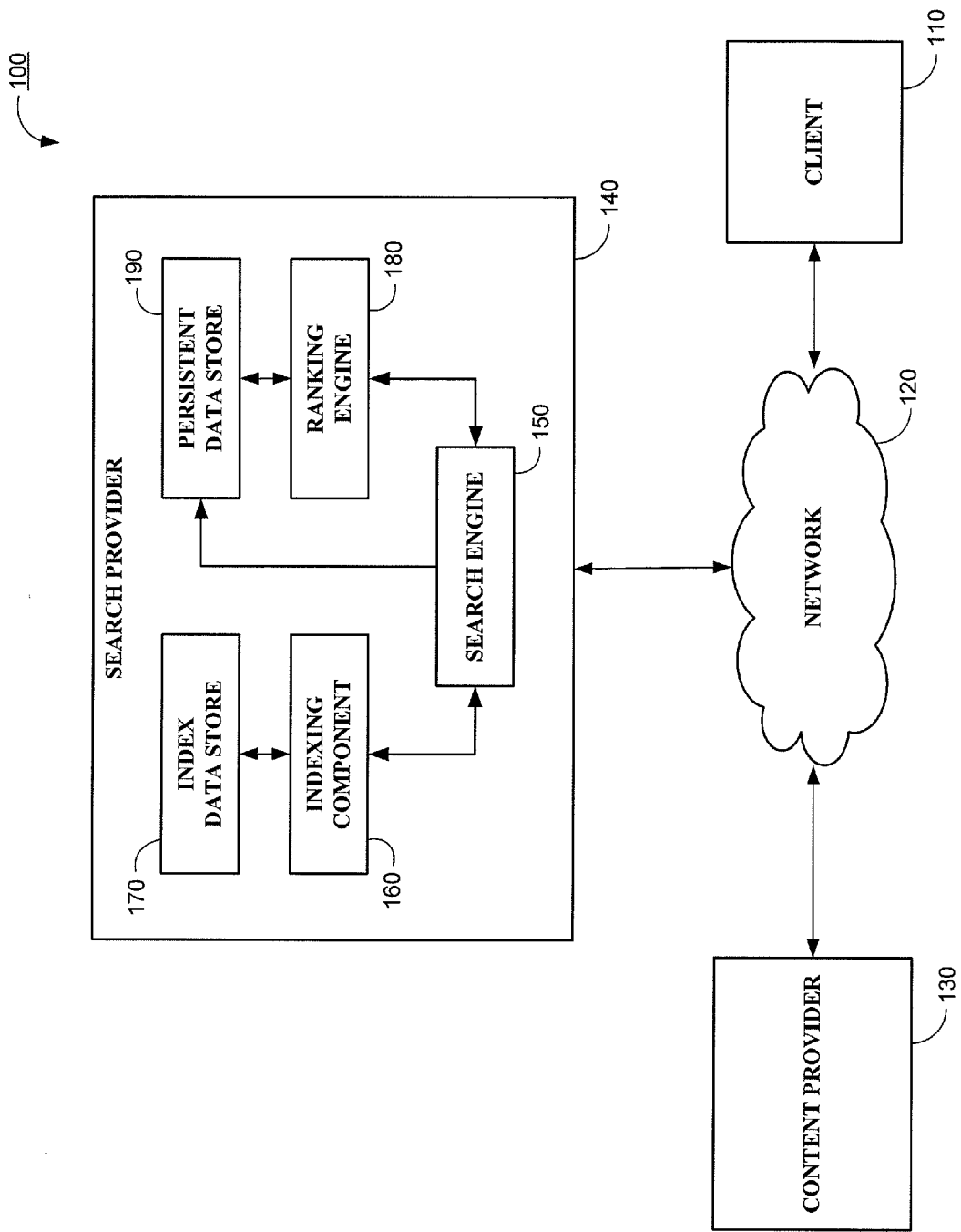
FIG. 1 illustrates a block diagram of a system for learning ranking functions that incorporate boosted ranking in a regression framework to determine the ranking of one or more content items that are responsive to a query according to one embodiment of the present invention.

FIG. 1 illustrates one embodiment of a system for learning ranking functions that incorporate boosted ranking in a regression framework to determine the ranking of one or more content items that are responsive to a query 100. System 100 includes one or more clients 110, a computer network 120, one or more content providers 130, and a search provider 140. The search provider 140 comprises a search engine 150, an indexing component 160, an index data store 170, a ranking engine 180 and a persistent data store 190.

The computer network 120 may be any type of computerized network capable of transferring data, such as the Internet. According to one embodiment of the invention, a given client device 110 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc. The present invention is not limited to only a single client device 110 and may comprise additional, disparate client devices. The client device 110 is therefore presented for illustrative purposes representative of multiple client devices.

According to one embodiment of the invention, a given content provider 130 and the search provider 140 are programmable processor-based computer devices that include persistent and transient memory, as well as one or more network connection ports and associated hardware for transmitting and receiving data on the network 120. The content provider 130 and the search provider 140 may host websites, store data, serve ads, etc. The present invention is not limited to only a single content provider 130 and may comprise additional, disparate content providers. The content provider 130 is therefore presented for illustrative purposes representative of multiple content providers. Those of skill in the art understand that any number and type of content provider 130, search provider 140 and client device 110 may be connected to the network 120.

The search engine 150, the indexing component 160 and the ranking engine 180 may comprise one or more processing elements operative to perform processing operations in response to executable instructions, collectively as a single element or as various processing modules, which may be physically or logically disparate elements. The index data store 170 and the persistent data store 190 may be one or more data storage devices of any suitable type, operative to store corresponding data therein. Those of skill in the art recognize that the search provider 140 may utilize more or fewer components and data stores, which may be local or remote with regard to a given component or data store.

In accordance with one embodiment, the client device 110, the search provider 140 and the content provider 130 are communicatively coupled to the computer network 120. Using the network 120, the search provider 140 is capable of accessing the content provider 130, which hosts content items a user may wish to locate through use of the search engine 150 at the search provider 140. The search provider 140 may communicate with the content provider 130 for maintaining cached copies at the persistent data store of content items that the content provider 130 hosts. The collection of items content items, as well as information regarding content items, is referred to as "crawling," and is the process by which the search provider 140 collects information upon which the search engine 150 performs searches.

The search provider 140 crawls one or more content providers 130 that are in communication with the network 120, which may comprise collecting combinations of content items and information regarding the same. An index component 160 parses and indexes the content items and related information that the search provider 150 collects through the crawling process. The index component 160 generates an index that provides a structure for the content items and related information that allows for location and retrieval of the content items and related information. According to one embodiment of the invention, the index component 160 creates an index of word-location pairs that allows the search engine 150 to identify specific content items and information regarding the same in response to a query, which may be from a user, software component, automated process, etc. The one or more indexes that the indexing component 160 generates are written to an index data store 170 for persistent storage and use by other components of the search provider 140.

A user of a given client device 110 desires to retrieve a content item from a content provider 130 that is relevant to a particular topic, but who is unsure or ignorant regarding the address or location of the content item, submits a query to the search engine 150. According to one embodiment, a user utilizes a given client device 110 to connect over the network 120 to the search engine 150 at the search provider 140 and provide a query. A typical query has one or more terms. For example, the query "New York Yankees" contains three terms and is referred to as a three-term query. Similarly, queries containing only one term are referred to as one-term queries, queries containing two terms are two-term queries, etc. A space or other delimiter character that the search engine 150 comprehends may delimit individual terms comprising a given query.

Upon receipt of the query, the search engine 150 examines the index using the query terms in an attempt to identify a result set that comprises content items that are responsive to the query. The search engine 150 formulates the result set for transmission over the network 120 and presentation to the user through use of the client device 110. Where the result set comprises one or more links to content items, the user may select a link in the result set to navigate to the content provider 130 that is hosting the content item that the link identifies. The search engine 150 may utilize a persistent data store 190 for storage of an historical log of the queries that users submit, which may include an indication of the selection by users of items in results sets that the search engine 150 transmits to users.

As discussed previously, users become increasingly frustrated when presented with a result set that does not identify content items that are more relevant to a given query prior to less relevant content items. Accordingly, the present embodiment provides a ranking engine 180 that is operative to utilize machine learning to determine a function to compute the relevance of a given content item to a given query. The ranking engine 180 receives query-content item pairs and applies a ranking function, the selection of which is described in greater detail herein, to determine the rank of the content item vis-à-vis the query.

The ranking engine 180 utilizes a feature vector of a given query-content item pair in determining the appropriate ranking. A feature vector may be developed by extracting a set of features from a given query-content item pair, where a given feature may be represented as a quantification of an aspect of a relationship between a query and content item, which may include quantifying aspects of the query, the content item, or both. According to one embodiment, a feature vector consists of three vector components: (1) query-feature vector $x^Q$, (2) query-feature vector $x^D$ and (3) query-feature vector $x^{QD}$. Query-feature vector $x^Q$ comprises features dependent on the query q and have constant values across all documents d in a document set, for example, the number of terms in the query or whether or not the query is a person's name. Query-feature vector $x^D$ comprises features dependent on a given document d and have constant values across all the queries q in the query set, for example the number of inbound links pointing to the given document, the amount of anchor-text in bytes for the given document and the language identity of the given document. Query-feature vector $x^{QD}$ comprises features dependent on the relation of the query q with respect to a given document d, for example, the number of times each term in the query q appears in the given document d or the number of times each term in the query q appears in the anchor-texts of the given document d.

A training set forms the basis for determining a ranking function that the ranking engine 180 utilizes to determine the ranking of content items responsive to a given query. The ranking engine 180 receives a training query and a set of content items for inclusion in a primary training set, which the ranking engine 180 may select. According to one embodiment, the ranking engine 180 presents content items from the training set to one or more human subjects for the assignment of a label indicating the relevance of content items in the training set to the query. For example, a five-level numerical grade (0, 1, 2, 3, or 4) is assigned to each query-document pair based on the degree of relevance, with a numerical grade 0 being least relevant and a numerical grade 4 being most relevant. Alternatively, the ranking engine 180 may access the persistent data store 190 to retrieve a past query (training query) and corresponding result set (primary training set), utilizing selection information from a user regarding the selection of items in the result set in response to the query to determine labels for the content items in the primary training set to the query.

The ranking engine 180 may develop one or more training subsets, a given training subset utilizing the label data and the feature vectors. For example, the ranking engine 180 may divide the primary training set into two training sets, where a first training subset comprises query document pairs that are assigned labels, $L_1$. According to one embodiment, the first training subset may encompass query document pairs that are assigned identical labels, such as all query document pairs that are assigned a label "2". According to another embodiment, the first training subset may encompass all query document pairs that are assigned any label, such as all query-document pairs that are assigned any of the labels from the five-level numerical grade set.

The remaining query document pairs may then be placed into a second training subset, $L_2$. According to one embodiment, where all query document pairs assigned an identical label are placed in $L_1$, the second training subset may comprise all remaining query document pairs that are assigned varying labels. According to another embodiment, where all query document pairs that are assigned any labels are placed in $L_1$, the remaining query document pairs without an assigned label are placed in the second training subset. According to other embodiments, the second training subset may comprise any combination of query documents pairs assigned a label or not assigned a label.

While the training subset $L_1$ is used to extract labeled data, the training subset $L_2$ may be used to generate a set of preference data based upon the feature vectors for one or more query document pairs by comparing the degree of relevancy between two content items with respect to a given query. For example, training subset $L_2$ may contain a given query q and two corresponding documents, $d_x$ and $d_y$. The feature vectors for the query document pairs $(q, d_x)$ and $(q, d_y)$ may be termed x and y, respectively. If $d_x$ is more relevant to the query q than $d_y$, the preference x>y may be established. The degree of relevancy of $d_x$ to the query q as compared to $d_y$ may be determined from labeled data, such as where $d_x$ has higher numerical label than $d_y$ for the query q, or from click through data, such as where selection information from users demonstrate that $d_x$ is selected more than $d_y$ for the query q. The ranking engine 180 may consider, for a given query in the respective training subsets, one or more pairs of documents within the search results in establishing preferences. Continuing with the present example, the ranking engine 180 may develop preference data from training subset $L_2$ only. On the basis of the label data and the preference data, the ranking engine 180 is operative to identify a ranking function, which the ranking engine 180 applies to determine the ranking of content items to a new query that the search engine 150 receives.

According to one embodiment, the ranking function that the ranking engine 180 develops and applies may utilize a general boosting framework that extends functional gradient boosting to optimize complex loss functions, which is explained in greater detail herein. More specifically, the embodiment uses a regression method to optimize a loss function based on quadratic upper bounds. Those of skill in the art recognize that a loss function may determine the difference over the content items in the training subsets between a label assigned by a human (as discussed, these labels may also be determined by the other methods that reflect the human perception regarding the relevance of a given query-content item pair, e.g., click-through information from the persistent data store 190 that the ranking engine 180 utilizes) and the output of the ranking function. Accordingly, when the ranking engine 180 applies the trained ranking function, the ranking engine 180 may determine the ranking of content items related to a query that the search engine 150 is processing.

When the search engine 150 receives a query from a client device 110 that the user is utilizing, the search engine 150 queries the index in the index data store 170 to determine a result set that is responsive to the query. The search engine 108 may also pass the query and result set to the ranking engine 180. The ranking engine 180 applies the trained ranking function to the one or more content items that it receives from the search engine 150, determining the ranking for the content items in the result set. According to one embodiment, the ranking engine 180 may use the ranking function to develop a ranking score for each content item. The search engine 150 receives the ranking scores for the content items in the result set from the ranking engine 180 and may utilize the scores for ranking or ordering purposes, e.g., presenting the content items or links to content items with the highest ranking scores (more relevant) prior to the content items or links to content items in the result set with lesser ranking scores (less relevant). The search engine 150 transmits the ranked result set to the client device 110 for viewing by the user.

Figure 2:
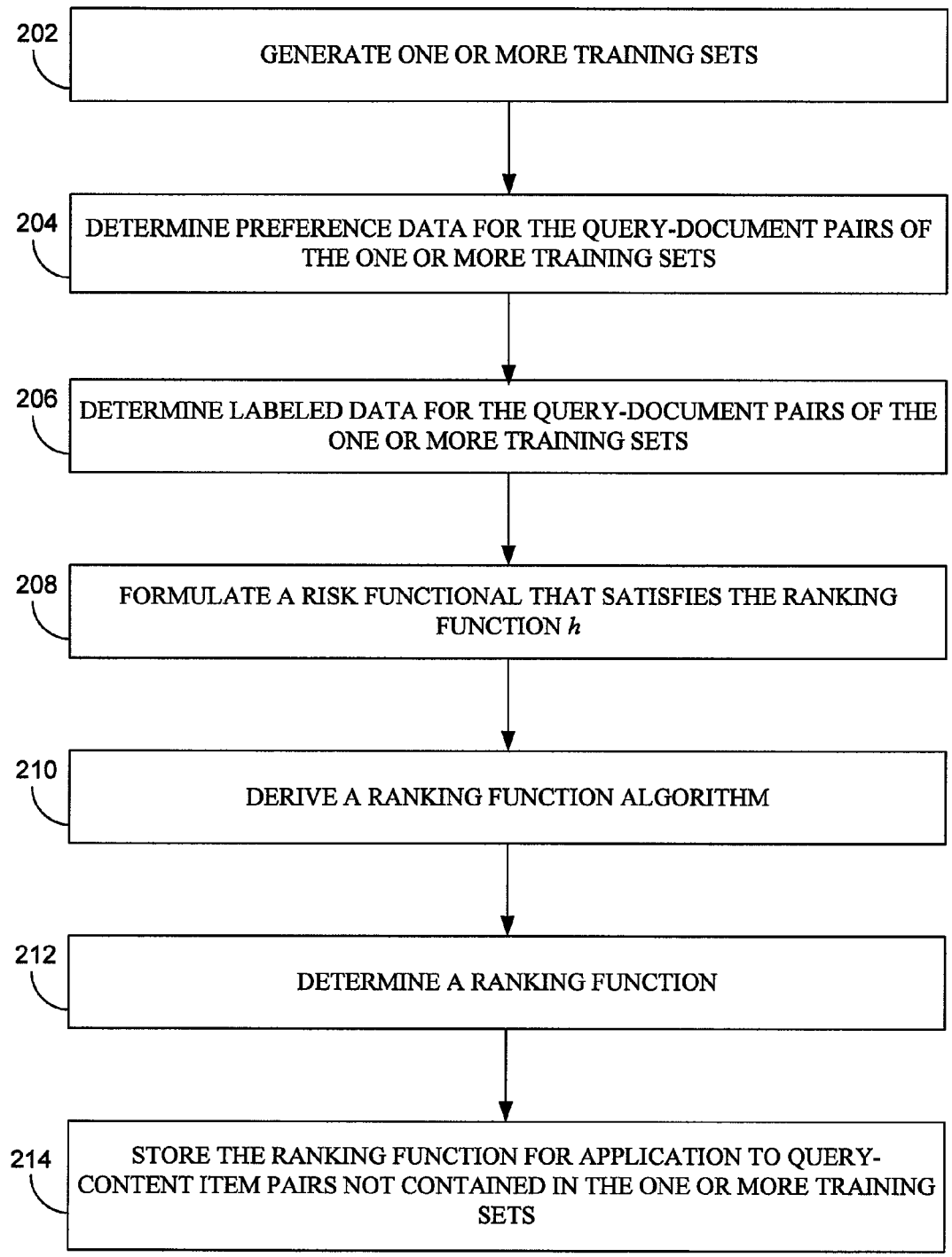
FIG. 2 illustrates a flow diagram presenting a method for learning ranking functions that incorporate boosted ranking in a regression framework to determine the ranking of one or more content items that are responsive to a query according to one embodiment of the present invention.

As introduced in FIG. 1, FIG. 2 illustrates one embodiment a method for learning ranking functions that incorporate boosted ranking to determine the ranking of one or more content items that are responsive to a query. To understand the ranking function that is developed to determine the ranking of one or more content items that are responsive to a query, it is useful to formulate the learning problem under consideration. A general optimization problem may be modeled in the following equation:

$$\mathcal{R}(h) = \frac{1}{n}\sum_{i=1}^{n} \phi_i(h(x_{i,1}), \ldots, h(x_{i,m_i}), y_i), \quad \text{Equation 2}$$

where h denotes a prediction function to be learned from the data, H is a pre-determined function class and $\mathcal{R}(h)$ is a risk functional with respect to h. The risk functional may be expressed in the following form:

$$\hat{h} = \operatorname*{argmin}_{h \in \mathcal{H}} \mathcal{R}(h), \quad \text{Equation 1}$$

where $\phi_i(h_1, \ldots h_{mi}, y)$ is a general loss function with respect to the first $m_i$ arguments $h_1, \ldots, h_{mi}$. The loss function $\phi_i$ can be a single variable function, where $m_i=1$, such as in a linear regression; or a two-variable function, where $m_i=2$, which may be used in pair-wise comparison; or a multi-variable function as used in certain structured prediction problems.

A solution to the loss function expressed in Equation 2 has been proposed in the art using the process of gradient boosting, expressed in the following equation:

$$\mathcal{R}(h) = \sum_{i=1}^{n} \phi_i(h(x_i)), \quad \text{Equation 3}$$

where the gradient $\nabla\phi_i(h(\chi_i))$ is estimated using a regression procedure at each step with uniform weighting. However, the process of gradient boosting does not provide for a convergence analysis. Therefore, according to one embodiment of the present invention, an extension of gradient boosting is utilized where a convergence analysis may be obtained, which may be expressed in the following equation:

$$\mathcal{R}(h) = \mathcal{R}_*(h(\chi_1), \ldots, h(\chi_N)), \quad \text{Equation 4}$$

where $N \leq \Sigma m_i$, such that as $\mathcal{R}$ depends on h only through the function values $h(x_i)$ and the function h can be identified with the vector $[h(x_i)]$ as a function of N variables.

Using a Taylor expansion, the risk functional may be expanded at each tentative solution $h_k$ for the function h as expressed in the following equation:

$$\mathcal{R}(h_k + g) = \mathcal{R}(h_k) + \nabla \mathcal{R}(h_k)^T g + \frac{1}{2} g^T \nabla^2 \mathcal{R}(h') g, \quad \text{Equation 5}$$

Analysis of the right-hand side of Equation 5 reveals that it resembles a quadratic, thus allowing for the replacement of the right hand side with a quadratic upper bound:

$$\mathcal{R}(h_k + g) \leq \mathcal{R}_k(g) = \mathcal{R}(h_k) + \nabla \mathcal{R}(h_k)^T g + \frac{1}{2} g^T W g, \quad \text{Equation 6}$$

where W is a Hessian diagonal matrix providing an upper bound between $h_k$ and $h_k+g$. If a variable is defined as $\tau_j = -[\nabla \mathcal{R}(h_k)]_j/w_j$, then $\nabla g \in C, \Sigma_j w_j(g(\chi_j)-\tau_j)^2$ is equal to the above quadratic form up to a constant. Accordingly, g may be found by calling a regression weak learner. Since at each step an attempt is made to minimize an upper bound $R_k$ of R, if the minimum is set to $g_k$, it becomes clear that $\mathcal{R}(h_k+g_k) \leq \mathcal{R}_k(g_k) \leq \mathcal{R}(h_k)$, so that by optimizing with respect to the problem $\mathcal{R}_k$, progress can be made with respect to optimizing $\mathcal{R}$.

The theory of utilizing quadratic approximation as an extension of gradient boosting is used to develop the following algorithm:

---
Algorithm 1 Greedy Algorithm with Quadratic Approximation
---

Input: $X = [x_e]_{e=1,\ldots,N}$
let $h_0 = 0$
for k = 0, 1, 2,...
    let $W = [w_e]_{e=1,\ldots,N}$ with either
        $w_e = \partial^2 R/\partial h_k(x_e)^2$ or          % Newton-type method
        with diagonal Hessian
    W global diagonal upper bound on the Hessian      % Upper-bound minimization
    let $R = [r_e]_{e=1,\ldots,N}$ where $r_e = w_e^{-1} \partial R/\partial h_k(x_e)$
    pick $\partial_k \geq 0$
    let $g_k = A(W, X, R, \epsilon_k)$
    pick step-size $s_k \geq 0$, typically by line search on R
    let $h_{k+1} = h_k + s_k g_k$
end

---

Algorithm 1 may then be utilized to determine a ranking function that incorporates boosted ranking to determine the ranking of one or more content items that are responsive to a query.

As FIG. 2 illustrates, the determination of a ranking function may initiate with the generation of one or more training sets, step 202. As discussed previously, a ranking engine may develop one or more training subsets from a primary training set utilizing both label data and feature vectors for query document pairs. The ranking engine may utilize the one or more training sets to develop a set of available preferences, step 204, which may be denoted as $$S = \{x_i > y_i, i=1, \ldots, N\}$$

In addition, the ranking engine may determine labeled data of the generated training set, step 206, which may be denoted as, $$L = \{(z_i, l_i), i=1, \ldots, n\}$$

where $z_i$ is the feature of a content item and $l_i$ is the corresponding numerically coded label.

Using both the preference data and the labeled data, a risk functional may be formulated, step 208, that satisfies the ranking function h such that the ranking function h satisfies the set of preferences, i.e. $h(x_i) \geq h(y_i)$, if $x_i > y_i$, $i=1, \ldots, N$, while at the same time $h(z_i)$ matches the label the label $l_i$. Using Algorithm 1 to fit both the preference data and the labeled data of the generated training set, a risk functional is formulated that satisfies the ranking function h, which may be expressed as:

$$\mathcal{R}(h) = \frac{w}{2} \sum_{i=1}^{N} (\max\{0, h(y_i) - h(x_i) + \tau\})^2 + \frac{1-w}{2} \sum_{i=1}^{n} (l_i - h(z_i))^2. \quad \text{Equation 7}$$

As Equation 7 illustrates, the risk functional consists of two parts: (1) with respect to preference data, a margin parameter $\tau$ is introduced to enforce that $h(x_i) \geq h(y_i) + \tau$, and if not the difference is quadratically penalized and (2) with respect to labeled data, the squared errors are minimized.

The parameter w is introduced as the relative weight for the preference that may be found by cross-validation. The risk functional expressed in Equation 7 may be optimized using quadratic approximation, where $$h(\chi_i), h(y_i), i=1, \ldots, N, h(z_i), i=1, \ldots, n$$

are considered unknowns and the gradient of $\mathcal{R}(h)$ is calculated with respect to those unknowns. In performing the calculation, the components of the negative gradient corresponding to $h(z_i)$ is determined to be $l_i - h(z_i)$ and the components of the negative gradient corresponding to $h(x_i)$ and $h(y_i)$, respectively are determined to be $$\max\{0, h(y_i) - h(\chi_i) + \tau\}, -\max\{0, h(y_i) - h(\chi_i) + \tau\}.$$

When $h(x_i) - h(y_i) \geq \tau$, the components of the negative gradient corresponding to $h(x_i)$ and $h(y_i)$ equal zero. For the second-order term, however, a verification may be made that the Hessian of $\mathcal{R}(h)$ is a block diagonal with 2-by-2 blocks corresponding to $h(x_i)$ and $h(y_i)$, and 1-by-1 blocks for $h(z_i)$. In particular, if the Hessian is evaluated at h, the 2-by-2 block equals to $$\begin{bmatrix} 1 & -1 \\ -1 & 1 \end{bmatrix}, \begin{bmatrix} 0 & 0 \\ 0 & 0 \end{bmatrix}$$

for $x_i > y_i$ with $h(x_i) - h(y_i) < \tau$ and $h(x_i) - h(y_i) \geq \tau$, respectively. The first matrix may be upper bounded by the diagonal matrix leading to a quadratic upper bound.

Utilizing the risk functional, a ranking function algorithm may be derived, step 210, expressed as follows:

---

Algorithm 2 Boosted Ranking using Successive Quadratic Approximation (QBRank)

---

Start with an initial guess $h_0$, for m = 1,2, ...,
1) we construct a training set for fitting $g_m(x)$ by adding the following
  for each $(x_i, y_i) \in S$,
    $(x_i, \max\{0, h_{m-1}(y_i) - h_{m-1}(x_i) + \tau\})$, $(y_i, -\max\{0, h_{m-1}(y_i) - h_{m-1}(x_i) + \tau\})$, and
    $\{(z_i, l_i - h_{m-1}(z_i)), i = 1, ..., n\}$.
  The fitting of $g_m(x)$ is done by using a base regressor with the above training set; We weigh the above preference data by w and labeled data by 1 − w respectively.
2) forming $h_m = h_{m-1} + \eta s_m g_m(x)$,
  where $s_m$ is found by line search to minimize the objective function.
  $\eta$ is a shrinkage factor.

---

The output of the ranking function algorithm is the ranking function h, step 212, which the algorithm expresses as $h_m = h_{m-1} + \eta s_m g_m(x)$, where $\eta$ is a shrinkage factor that is determined by cross-validation and $s_m$ is representative of a line search strategy incorporated into the ranking function to minimize the function. Upon determining the ranking function the ranking engine stores the ranking function for use in determining the ranking of query-content item pairs not contained in the training set, step 214.

Figure 3:
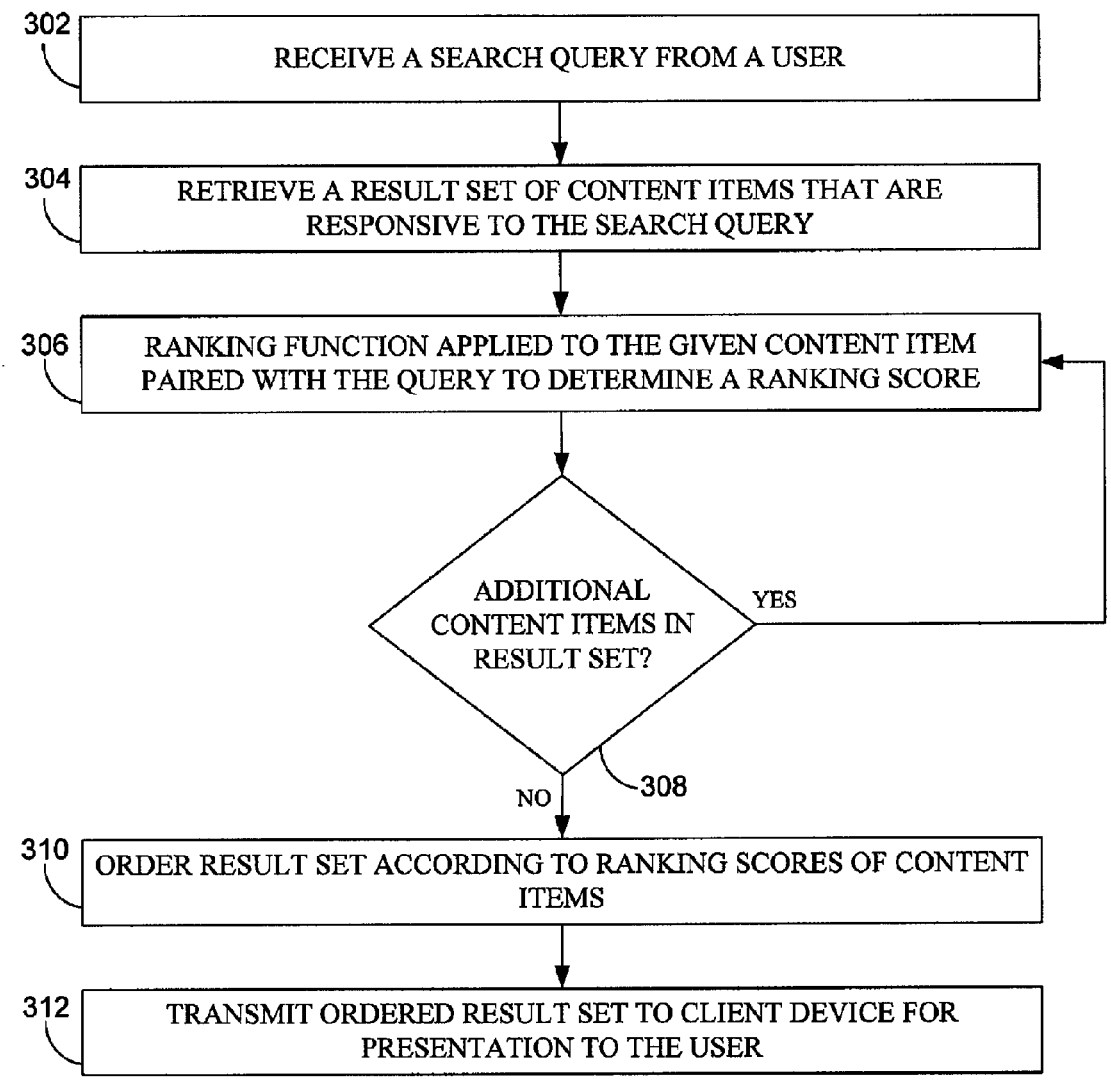
FIG. 3 presents one embodiment of a method for using a learned ranking function to order a result set that the search engine deems responsive to a given query according to one embodiment of the present invention.

FIG. 3 presents one embodiment of a method for using the ranking function to order a result set that the search engine deems responsive to a given query. A user submits a query to the search engine, step 302, which causes the search engine to retrieve a set of content items that are to be ranked according to the relevance of the content items to the query, step 304. In one embodiment, only content including or associated with one or more terms in the query are included in the result set, for example, content items that contain user supplied tags that contain the terms. In another embodiment, the search engine may utilize other criteria to select content for inclusion in the result set.

According to one embodiment, the trained ranking function is used to determine a ranking score for a given content item as paired with the query, step 306. The ranking function receives a feature vector as well as labeled data for a given content item as input and provides a ranking score. A check is performed to determine if additional content items exist to which the ranking function is to be applied, step 308. Processing continues until a ranking score has been calculated for each of the content items in the result set, step 306. The search engine orders the result set according to the ranking score associated with the content item in the result set, step 310. The search engine transmits the ordered result set to the client device for presentation to the user, step 312.

In accordance with the foregoing description, the present invention provides for systems, methods and computer program products for learning ranking functions that incorporate boosted ranking to determine the ranking of one or more content items that are responsive to a query. In learning ranking functions that incorporate boosted ranking to determine the ranking of one or more content items that are responsive to a query, the present invention allows for an effective and efficient function which retrieves and efficiently ranks content items.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for learning ranking functions to determine the ranking of one or more new content items that are responsive to a new query, the method comprising:
   obtaining a plurality of training query-content item pairs;
   generating one or more training sets comprising the plurality of training query-content item pairs;
   designating the plurality of training query-content item pairs of the one or more training sets;
   determining one or more feature vectors for the plurality of training query-content item pairs of the one or more training sets;
   generating one or more training subsets containing the designated plurality of training query-content item pairs of the one or more training sets;
   determining preference data from the one or more training subsets based on the one or more feature vectors;
   determining labeled data from the one or more training subsets;
   determining a ranking function based upon the preference data and the labeled data for the plurality of training query-content item pairs of the one or more training sets; and
   applying the ranking function to one or more new query-content item pairs to determine the rank of a new content item relative to a new query.

2. The method of claim 1, wherein determining a ranking function based upon the preference data and the labeled data further comprises deriving a risk functional based on a quadratic approximation and another ranking function, wherein the risk functional uses more than one parameter associated with the preference data; and generating a risk functional algorithm, wherein the output of the risk functional algorithm is the ranking function comprising one or more parameters and a regression function.

3. The method of claim 1 comprising utilizing one or more regularization parameters to control parameters of the ranking function.

4. The method of claim 1 wherein the one or more feature vectors further comprises at least three vector components, wherein the first vector component comprises a set of features dependent on the training query, the second vector component comprises a set of features dependent on the training content, and the third vector component comprises a set of features dependent on the training query-content item pairs.

5. The method of claim 1 wherein generating one or more training sets comprising the plurality of training query-content item pairs further comprises extracting query independent features for the plurality of training query-content item pairs.

6. The method of claim 1 wherein designating the plurality of training query-content item pairs of the one or more training sets comprises assigning a numerical grade to each query-content item pair or using click through data for each query-content item pair; and wherein the preference data is determined based on the assigned numeric grade or click-through data.

7. The method of claim 1 wherein generating one or more training sets comprising the plurality of training query-content item pairs further comprises determining a relevance label based on historical click through data for a given query-content item pair.

8. The method claim 1 further comprising ordering the new content item in a result set according to the rank of the new content item.

9. The method of claim 8 further comprising transmitting the result set to the user.

10. Computer readable media comprising program code that when executed by a programmable processor causes execution of a method for learning ranking functions to determine the ranking of one or more new content items that are responsive to a new query, the computer readable media comprising:
    program code for obtaining a plurality of training query-content item pairs;
    program code for generating one or more training sets, wherein each training set is generated from the plurality of training query-content item pairs;
    program code for designating the plurality of training query-content item pairs of the one or more training sets;
    program code for determining one or more feature vectors for the plurality of training query-content item pairs of the one or more training sets;
    program code for generating one or more training subsets containing the designated plurality of training query-content item pairs of the one or more training sets;
    program code for determining preference data from the one or more training subsets based on the one or more feature vectors;
    program code for determining labeled data from the one or more training subsets;
    program code for determining a ranking function based upon the preference data and the labeled data for the plurality of training query-content item pairs of the one or more training sets; and
    program code for applying the ranking function to one or more new query-content item pairs to determine a rank of the new content item relative to a new query.

11. The computer readable media of claim 10, wherein program code for determining a ranking function based upon the preference data and the labeled data further comprises deriving a risk functional based on a quadratic approximation and another ranking function, wherein the risk functional uses more than one parameter associated with the preference data; and generating a risk functional algorithm, wherein the output of the risk functional algorithm is the ranking function comprising one or more parameters and a regression function.

12. The computer readable media of claim 10 comprising utilizing one or more regularization parameters to control parameters of the ranking function.

13. The computer readable media of claim 10 wherein the one or more feature vectors further comprises at least three vector components, wherein the first vector component comprises a set of features dependent on the training query, the second vector component comprises a set of features dependent on the training content, and the third vector component comprises a set of features dependent on the training query-content item pairs.

14. The computer readable media of claim 10 wherein program code for generating one or more training sets comprising the plurality of query-content item pairs further comprises program code for extracting query independent features for the plurality of training query-content item pairs.

15. The computer readable media of claim 10 wherein program code for determining labeled data for the plurality of training query-content item pairs of the one or more training sets comprises assigning a numerical grade to each query-content item pair or using click through data for each query-content item pair; and wherein the preference data is determined based on the assigned numeric grade or click-through data.

16. The computer readable media of claim 10 wherein program code for generating one or more training sets comprising the query-content item pairs further comprises program code for determining a relevance label based on historical click through data for a given query-content item pair.

17. The computer readable media of claim 10 further comprising program code for ordering the new content item in a result set according to the rank of the new content item.

18. The computer readable media of claim 17 further comprising program code for transmitting the result set to the user.

19. A system for learning ranking functions to determine the ranking of one or more content items that are responsive to a query, the system comprising:
  a computer network;
  a search engine operative to receive a search query comprising one or more terms from a user and to locate and retrieve one or more content items and related information responsive to the search query;
  an indexing component operative to parse the search query into one or more constituent terms and generate one or more indexes that defines a structure for the content items and related information that allows for location and retrieval of the content items and related information;
  an index data store operative to store the one or more indexes generated by the indexing component;
  a persistent data store operative to store a historical log of queries that users submit; and
  a ranking engine operative to,
    obtain a plurality of training query-content item pairs,
    generate one or more training sets, wherein each training set is generated from the plurality of training query-content item pairs,
    designate the plurality of training query-content item pairs of the one or more training sets,
    determine one or more feature vectors for the plurality of training query-content item pairs of the one or more training sets,
    generate one or more training subsets containing the designated plurality of training query-content item pairs of the one or more training sets,
    determine preference data from the one or more training subsets based on the one or more feature vectors,
    determining labeled data from the one or more training subsets,
    determine a ranking function based upon the preference data and the labeled data for the plurality of training query-content item pairs of the one or more training sets, and
    apply the ranking function to one or more new query-content item pairs to determine the rank of a new content item relative to a new query.

20. The system of claim 19, wherein the ranking engine is operative to derive a risk functional based on a quadratic approximation and another ranking function, wherein the risk functional uses more than one parameter associated with the preference data; and generate a risk functional algorithm, wherein the output of the risk functional algorithm is the ranking function comprising one or more parameters and a regression function.

21. The system of claim 19, wherein the ranking engine is operative to utilize one or more regularization parameters to control parameters of the ranking function.

22. The system of claim 19, wherein the ranking engine is operative to determine the one or more feature vectors further comprises at least three vector components, wherein the first vector component comprises a set of features dependent on the training query, the second vector component comprises a set of features dependent on the training content, and the third vector component comprises a set of features dependent on the training query-content item pairs.

23. The system of claim 19, wherein the ranking engine is operative to extract query independent features for the plurality of training query-content item pairs.

24. The system of claim 19, wherein the ranking engine is operative to determine labeled data for the plurality of training query-content item pairs of the one or more training sets through assignment of a numerical grade to each query-content item pair or using click through data for each query-content item pair; and wherein the preference data is determined based on the assigned numeric grade or click-through data.

25. The system of claim 19, wherein the ranking engine is operative to determine a relevance label based on a historical log of click through data for a given query-content item pair.

26. The system of claim 19, wherein the search engine is operative to order the new content item in a result set according to the rank of the new content item.

27. The system of claim 26, wherein the search engine is operative to transmit the result set to the user.

* * * * *